United States Patent
Sato et al.

[19]

[11] Patent Number: 6,112,878
[45] Date of Patent: Sep. 5, 2000

[54] AUTOMOBILE MANUFACTURING LINE

[75] Inventors: Minoru Sato, Sayama; Soichiro Uchimura, Suzuka; Yuzo Uenohara, Sayama, all of Japan; Michael Oatridge, Barrie, Canada; Donald Gallagher, Everett, Canada; Mark Earle, Shelburne, Canada

[73] Assignees: Honda Giken Kogyo Kabushiki Kaisha, Tokyo, Japan; Honda Canada Incorporated, Ontario, Canada

[21] Appl. No.: 09/210,600

[22] Filed: Dec. 15, 1998

[30] Foreign Application Priority Data

Dec. 16, 1997 [JP] Japan ................................ 9-346506

[51] Int. Cl.⁷ .......................... B65G 15/64; B65G 21/22; B65G 47/22; B65G 47/24
[52] U.S. Cl. .................................. 198/346.2; 198/339.1
[58] Field of Search ........................ 198/346.2, 339.1, 198/457.03, 485.1, 486.1, 606

[56] References Cited

U.S. PATENT DOCUMENTS

| | | | |
|---|---|---|---|
| 3,690,435 | 9/1972 | King et al. ........................ | 198/606 X |
| 3,690,478 | 9/1972 | Brummett et al. ............... | 198/486.1 X |
| 4,144,960 | 3/1979 | Scourtes ........................... | 198/346.2 |
| 4,729,467 | 3/1988 | Vanderlinde ..................... | 198/586 |
| 4,917,230 | 4/1990 | Barchman ....................... | 198/457.03 X |
| 4,982,728 | 1/1991 | Matsuda et al. ................. | 198/346.2 X |
| 5,873,449 | 2/1999 | Davenport ....................... | 198/346.2 X |

Primary Examiner—Christopher P. Ellis
Assistant Examiner—Gene O. Crawford
Attorney, Agent, or Firm—Arent Fox Kintner Plotkin & Kahn PLLC

[57] ABSTRACT

An automobile manufacturing line is provided which comprises a first assembly line, a second assembly line positioned parallel to the first assembly line on one side thereof, and a third assembly line positioned parallel to the first assembly line on the other side thereof. A first conveyor is located between the first and second assembly lines for carrying workpieces from the end of the first assembly line to the beginning of the second assembly line, and a second conveyor is located between the second assembly line and the third assembly line for carrying workpieces from the end of the second assembly line to the beginning of the third assembly line. The first assembly line, the first conveyor, the second assembly line, the second conveyor, and the third assembly line are arranged in a substantially spiral configuration. The first and second conveyors are overhead conveyors such that parts and workpieces can be transported to the assembly lines by passing underneath the conveyors.

8 Claims, 7 Drawing Sheets

(a) IMPLEMENTATION EXAMPLE (b) COMPARISON EXAMPLE

AUTOMOBILE MANUFACTURING LINE

BACKGROUND OF THE INVENTION

1. Field of the Invention

The present invention is directed to an automobile manufacturing line, and in particular, to an automobile manufacturing line which is laid out in a generally spiral arrangement.

2. Description of the Prior Art

Prior art automobile manufacturing lines, such as disclosed in Japanese Laid-Open Publication No. 6-49255 are arranged with different manufacturing process lines being arranged parallel to one another with conveyor loops located at the ends of the parallel manufacturing lines, to carry a workpiece from one line to the next line. This prior art arrangement provides a zig-zag line layout.

The above-described prior art manufacturing line arrangement with a zig-zag layout, is an improvement over a straight line layout, in that it reduces the walking distance between manufacturing process lines and it also shortens the overall length of the automobile manufacturing line.

However, in the zig-zag layout of the automobile manufacturing line, in order to deliver parts to a manufacturing process line in the interior of the zig-zag, it is necessary to use an overhead conveyor in order to avoid parallel manufacturing lines located in front of the manufacturing line to which the part is being delivered. The use of the overhead conveyors decreases the efficiency and makes it more difficult to coordinate the delivery operation.

SUMMARY OF THE INVENTION

It is the primary object of the present invention to provide an automobile manufacturing line which is arranged in order to reduce the walking distance of associates working on the line, and to improve the delivery efficiency of parts to manufacturing process lines.

The present invention is directed to a spirally arranged manufacturing line where the center of the spiral is the starting point for the assembly. The manufacturing line involves the assembly of side panels and roofs to the underbody of an automobile. By centralizing the manufacturing line, the length of the manufacturing line can be shortened and the walking distance for associates working on the line, is also reduced.

Portions of the manufacturing line are positioned above the manufacturing plant floor such that a delivery route for parts to the center of the spiral, which is the starting point of the line, can be located on the floor of the manufacturing plant. This arrangement maximizes the efficiency of the delivery operation to the manufacturing line.

DETAILED DESCRIPTION OF THE PREFERRED EMBODIMENT

Figure 1:
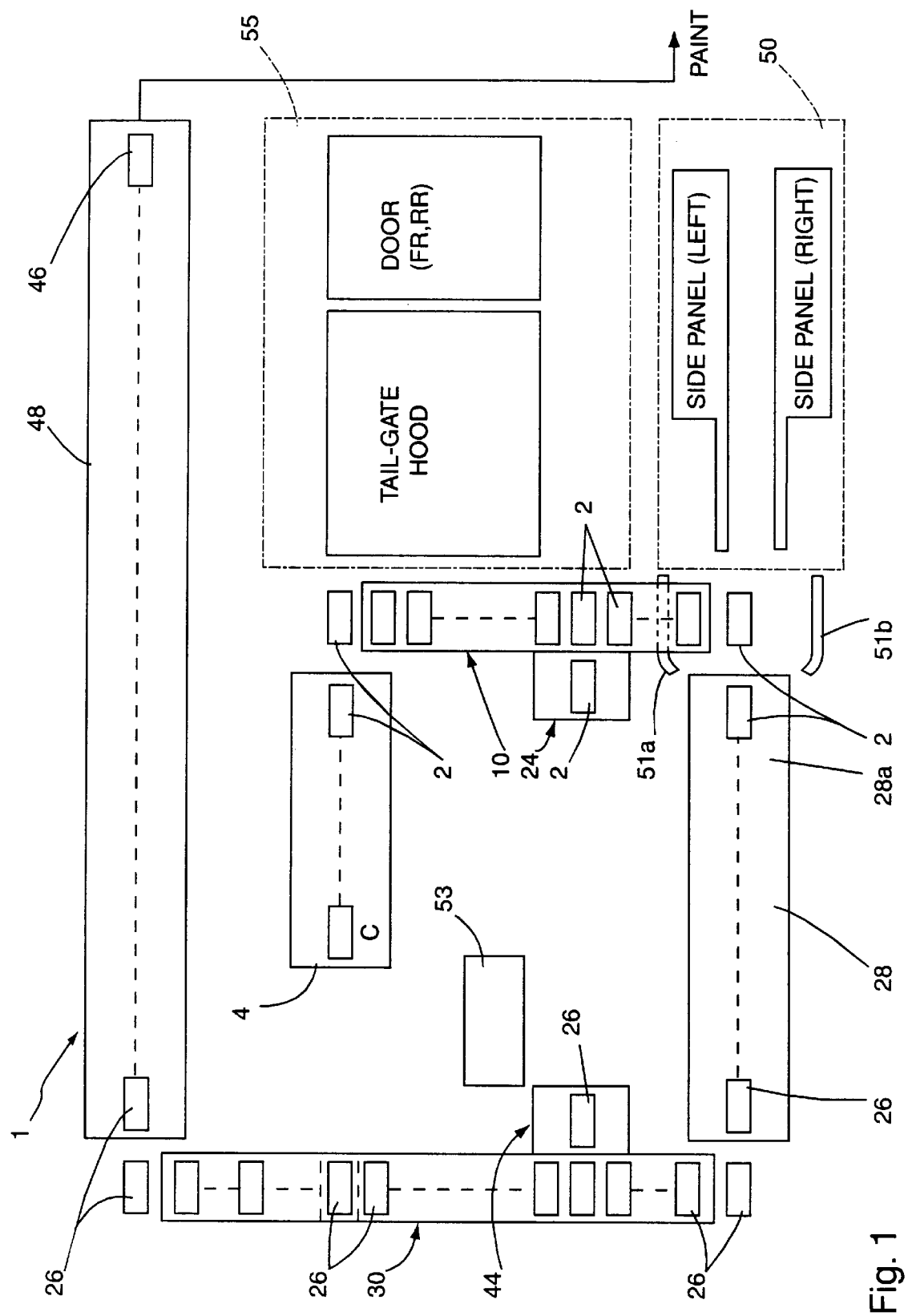
FIG. 1 is a plan view of an automobile manufacturing line of the present invention.

Referring to FIG. 1, automobile manufacturing line 1 comprises a first assembly line where underbody 2 is assembled. The underbody 2 is then transferred by the first conveyor system 10, which is an overhead transfer conveyor, to the second assembly line 28 where the underbody is assembled with the main body 26. After assembly, the main body 26 is transferred from the second assembly line 28 to the third assembly line 48 by the second conveyor system 30. In the third assembly line 48, the main body 26 goes through spot welding and MIG welding to become a white body 46.

As can be seen, the automobile manufacturing line 1 has a spiral layout which comprises the first assembly line 4, first conveyor system 10, second assembly line 28, second conveyor system 30, and third assembly line 48. The first assembly line 4, which is the starting point for the assembly of the automobile, is located approximately at the center of the spiral arrangement. As a result of the centralizing of the layout of the automobile manufacturing line, the length of the manufacturing line is shortened.

Left and right side panels are assembled on the first subassembly line located near the delivery area 28a of the second assembly line 28. Delivery conveyor 51a, which is between the first subassembly line 50 and the second assembly line 28, transports the left side panels to the delivery area 28a. Similarly, delivery conveyor 51b is located on the right side to transport right side panels to the delivery area 28a.

The left side panel delivery conveyor 51a, which is on the floor level, passes under the first conveyor system 10, and the right side panel delivery conveyor 51b is located on the other side of the first conveyor system 10. Further, parts conveyor 53 is located below the second conveyor system 30 for delivering parts from outside the assembly line to the first assembly line 4.

The space between the third assembly line 48 and the first subassembly line 50 is utilized for the subassembly of the tail gate, hood, and front and rear doors. This is referred to as the second subassembly line.

Figure 2:
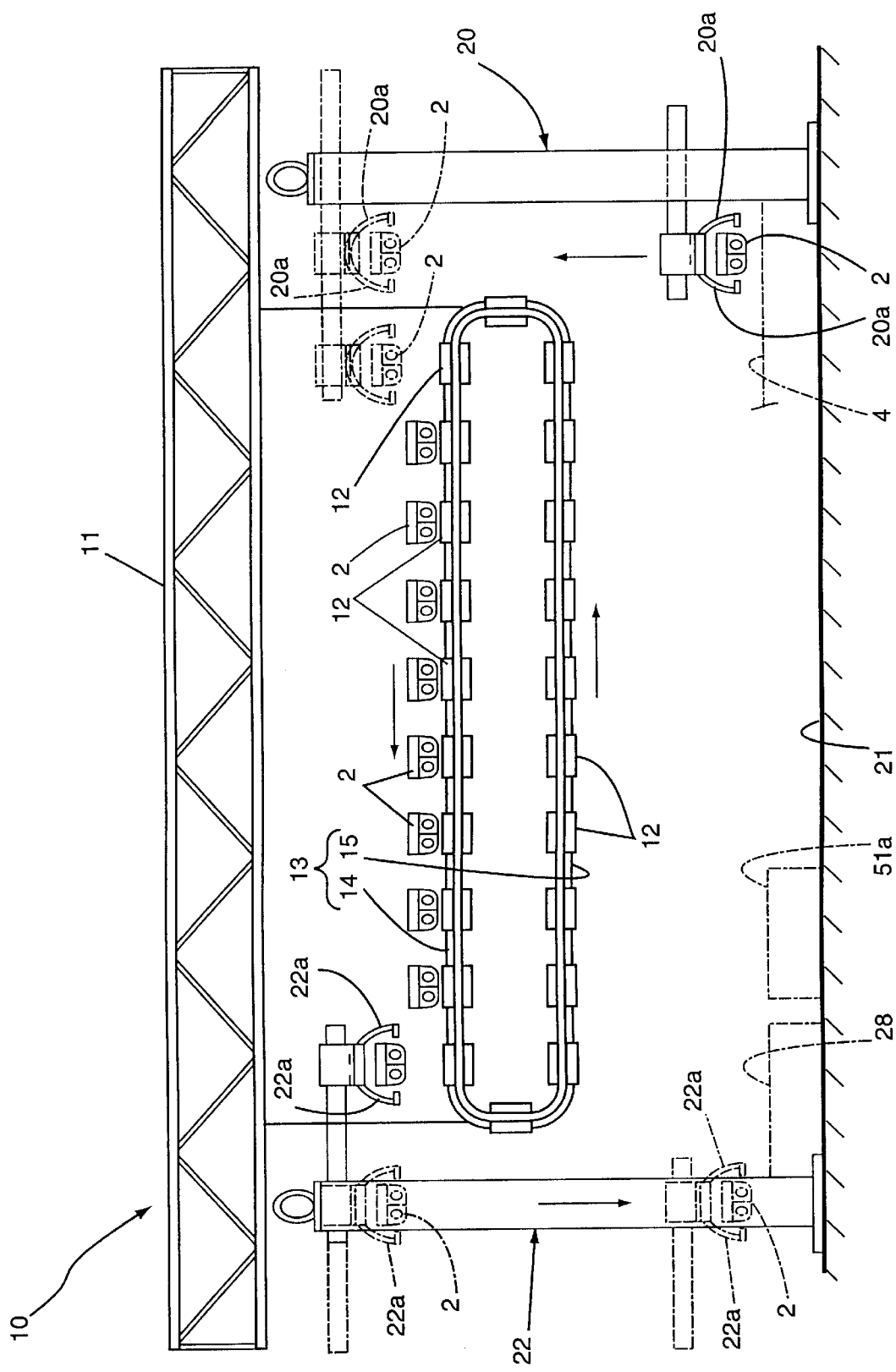
FIG. 2 is a side view of the first conveyor system of the automobile manufacturing line of the present invention.

Referring to FIG. 2, the first conveyor system 10 comprises pallets 12 that travel along the conveyor path 13. On the right side of conveyor path 13, is the first drop lift 20 that raises the underbody 2 to the conveyor path 13. On the left side of the conveyor path 13, is the second drop lift 22 that lowers the underbody 2. The conveyor path 13 is suspended at a predetermined height below the ceiling 11.

Since the first conveyor system 10 is an overhead conveyor, the floor space beneath the conveyor path 13 is utilized for a delivery conveyor 51a for left side panels, and as a result the costs of the left side panel delivery conveyor 51a is minimized. Further, the delivery efficiency of the left side panel delivery conveyor 51a is enhanced.

The conveyor path 13 comprises an upper side supply path 14, and lower side return path 15 which is in the form of a loop. The pallets 12 move with the help of a chain (not shown) in the direction indicated by the arrows.

First drop lift 20 lifts the underbody 2 delivered from the first assembly line 4 using the lift attachment 20a, and raises it to the conveyor path 14. The drop lift 20 moves the underbody 2 sideways so that underbody 2 can be transferred to the right side pallet 12.

Second drop lift 22 lifts the underbody 2 from the left side pallet 12 by moving sideways using lift attachment 22a (as shown with dotted lines) and then lowers it to second assembly line 28.

Figure 3:
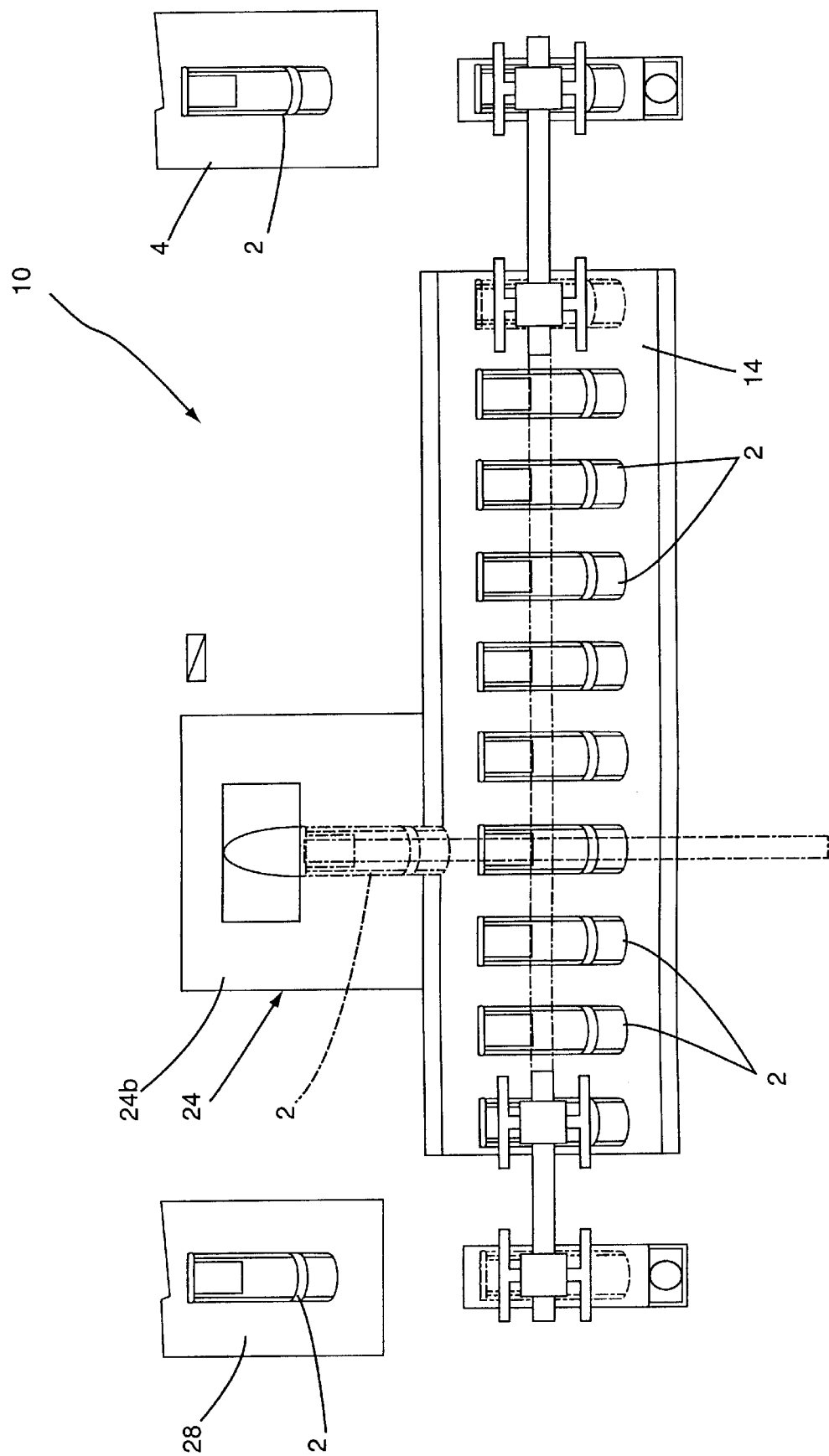
FIG. 3 is a plan view thereof.

Referring to FIG. 3, the first conveyor system 10 transfers the underbody 2 sideways along the supply path 14. A quality inspection area 24 is located midway along the supply path 14. Because the underbodies 2 are transferred sideways, a comparatively large number of underbodies 2 can be stocked in a limited area of supply path 14. Therefore, even if the first assembly line 4 is stopped for some reason, due to the large number of underbodies 2 in the supply path 14, the underbodies 2 can be transferred to the next process without any interruptions. This results in maximizing the production efficiency.

The first quality inspection area 24 selects underbodies 2 from supply path 14 for random sampling using sampling equipment (not shown) and the selected underbodies 2 are then inspected on inspection deck 24b. By placing the first quality inspection 24 in the first conveyor system 10, the quality of the underbodies 2 can be inspected, and therefore only the underbodies 2 that have passed inspection go to the next process. As a result, it is not essential to assemble rejected parts with the main body at the second assembly line 28 and this results in a further enhancement of the production efficiency.

Figure 4:
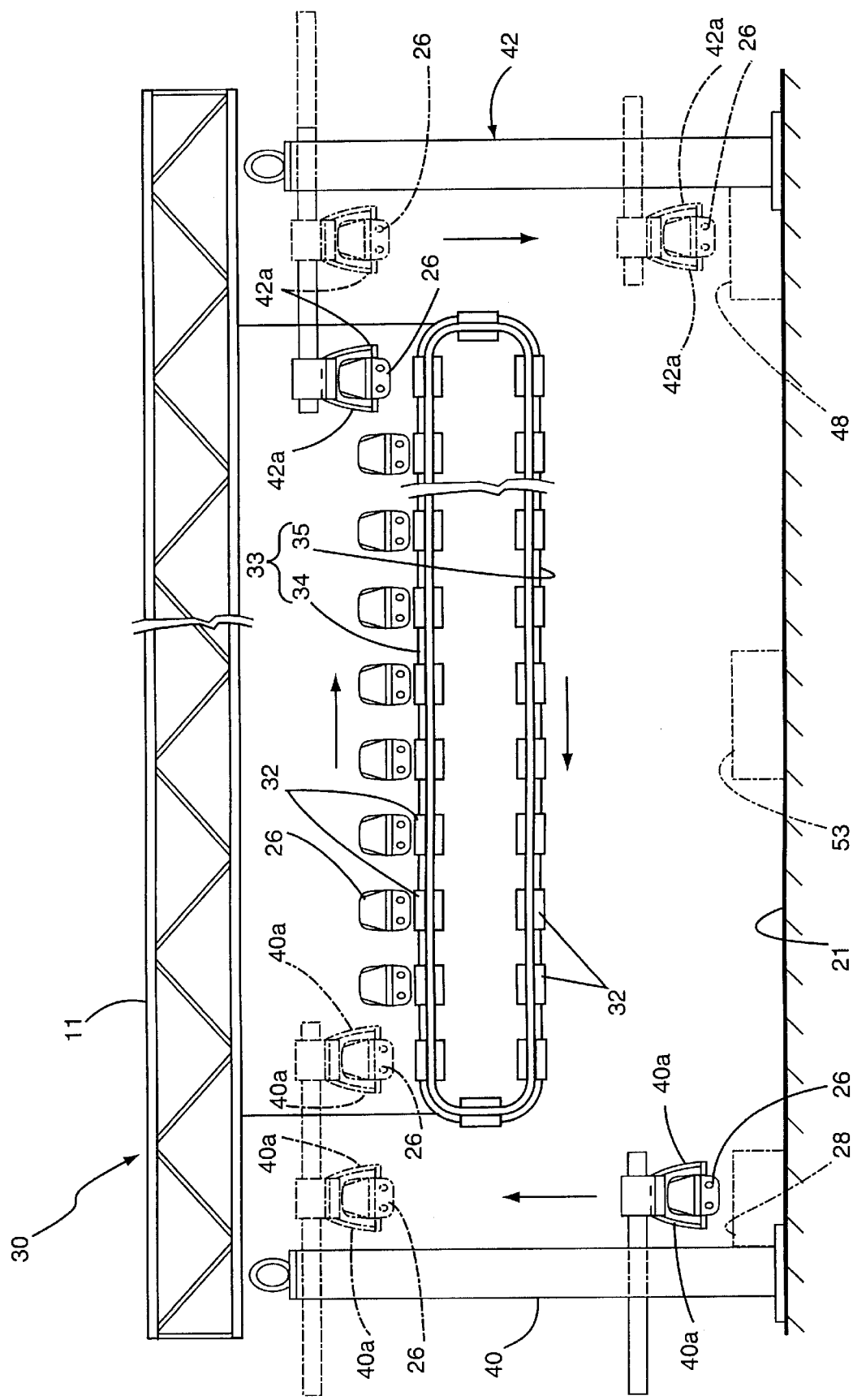
FIG. 4 is a side view of a second conveyor system of the automobile manufacturing line of the present invention.

Referring to FIG. 4, second conveyor system 30 is the same as first conveyor system 10 and comprises pallets 32 which travel along the conveyor path 33. On the left side of the conveyor path 33 is the third drop lift that raises the main body 26 to the conveyor path 33. On the right side of the conveyor path 33 is the fourth drop lift 42 that lowers the main body 26. The conveyor path of the second conveyor system 30 is suspended at a predetermined height from the ceiling 11.

By positioning the second conveyor system 30 overhead, the floor space 21 below the conveyor path 33 can be utilized as a delivery conveyor 53. As a result, the costs of parts conveyor 53 can be minimized and further the delivery efficiency of the parts conveyor 53 is enhanced.

The conveyor 33 comprises an upper supply path 44 and a return path 35 which form a loop. The pallets 32 are moved by means of a chain (not shown) in the direction of the arrows.

The third drop lift 40 raises the main body 26 delivered by the second assembly line 28 using lift attachment 40a and raises it to the conveyor path 34. The main body 26 is moved sideways on the left side pallet 32. Fourth drop left 42 raises the main body 26 from the right side pallet 32 using a lift attachment and moves it sideways and lowers it to the third assembly line 48.

Figure 5:
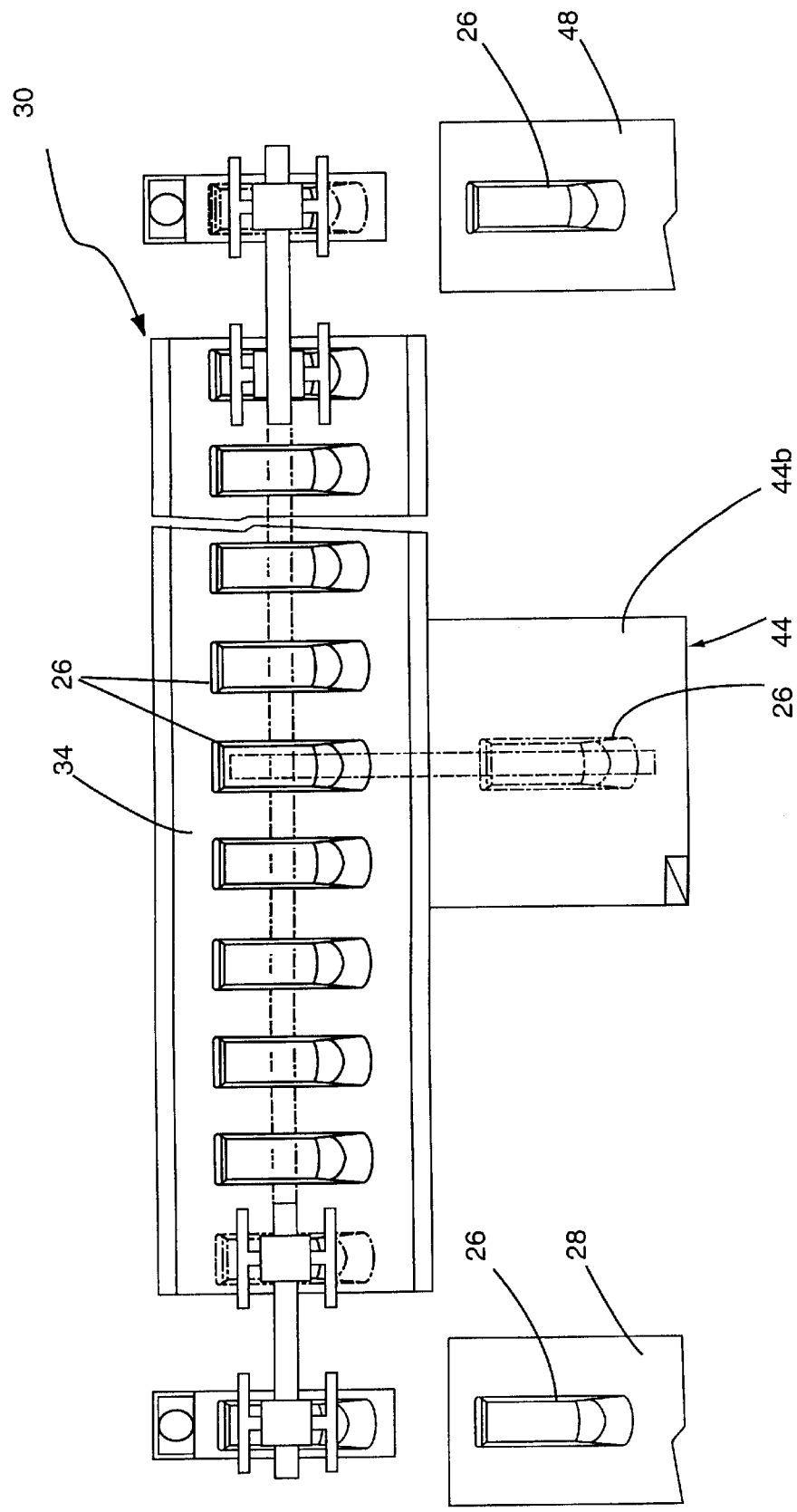
FIG. 5 is a plan view thereof.

Referring to FIG. 5, the second conveyor system 30 transfers the main body 26 sideways along the supply path 34. A second quality inspection area 44 is located midway along the supply path 34. As main bodies 26 are transferred sideways, a comparatively large number of main bodies can be stocked in the limited area of the supply path 34. Thus even if the second assembly line 28 stops for some reason, the main bodies 26 in stock can be transferred to the next process without any interruption. This results in a further enhancement of the production efficiency.

The second quality inspection area 44 selects main bodies 26 from supply path 34 for random sampling, using an overhead hanger which picks up the body (not shown), and these main bodies 26 are then inspected on inspection deck 44b. By locating the second quality inspection area 44 in the second conveyor system 30, the quality of the main bodies 26 assembled on the second assembly line 28 can be inspected. Therefore, only main bodies 26 that have passed inspection go on to the next process. As a result, rejected parts are not used to build a white body on the third assembly line 48, and this also results in a further enhancement of the production efficiency.

Figure 6:
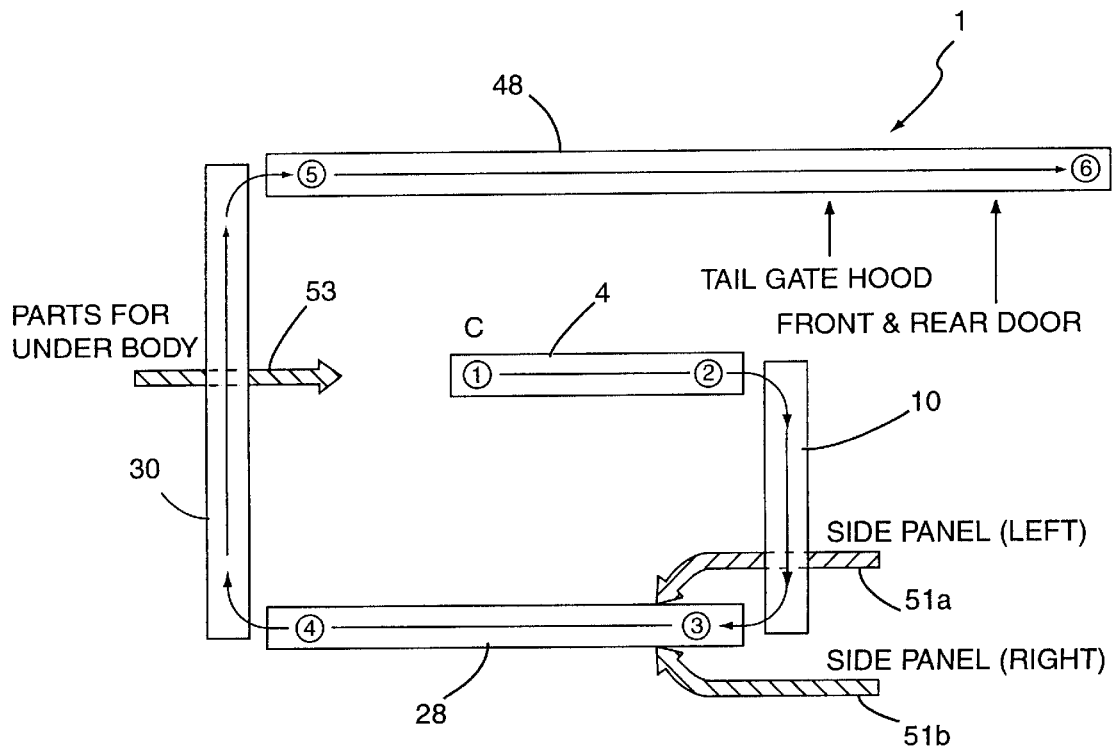
FIG. 6 is a diagram for explaining the functioning of the automobile manufacturing line of the present invention.

Referring to FIG. 6, the parts required for the automobile underbody are delivered to the first assembly line 4 in the delivery area ① and are assembled to the underbody as the underbody moves from delivery area ① to transfer area ②. From the first assembly line 4, the underbody is delivered to the second assembly line 28 using first conveyor 10 which is an overhead conveyor. With the first conveyor system 10, the first drop lift 20 raises the underbody 2 using lift attachment 20a, and carries it to supply path 14. The underbody 2 is then moved sideways on the right side pallets 12. The pallets 12 then move along the supply path 14 in the direction of the arrows to reach the left side corner. Once the underbody 2 reaches the left side corner of supply path 14, the lift attachment 22a of the second drop lift 22 engages the underbody 2, moves it sideways, and lowers it to the second assembly line 28 as indicated by the arrows.

Once the underbody 2 has lowered to the height of the second assembly line 28, it is transferred to delivery area ③ of the second assembly line 28. The left side panels are delivered to the delivery area ③ using an overhead delivery conveyor 51a which moves the panels above the first conveyor system 10, as shown by the shaded arrows. The right side panels are delivered from the outer side of the first conveyor system 10 using delivery conveyor 51b as shown by the shaded arrows. The right and left side panels and roof are then installed and the underbody 3 is transferred from the delivery area ③ to the transfer area ④.

The main body that is delivered to the transfer area ④ is carried to the third assembly line 48 by the second conveyor system 30. In this transfer, the third drop lift 40 raises the main body 26 using lift attachment 40a, and carries it to the supply path 34. It is then moved sideways to transfer the main body 26 onto a left side pallet 32. The pallets 32 then move along the supply path 34 in the direction of the arrows to reach the right side corner. Once the main body 26 reaches the right side corner of supply path 34, the lift attachment 42a of the fourth drop lift engages the main body, moves it sideways and lowers it to the third assembly line 48 as shown by the dotted lines. The main body 26 is lowered to the third assembly line 48 and is delivered to the delivery area ⑤ of the third assembly line 46 as shown in FIG. 6. While transferring the main body 26 from delivery area ⑤ to transfer area ⑥, spot welding and MIG welding are carried out and the tail gate, hood and front and rear doors, which are built in the second subassembly line, are assembled to the main body 26 to form white body 46.

Figure 7A:
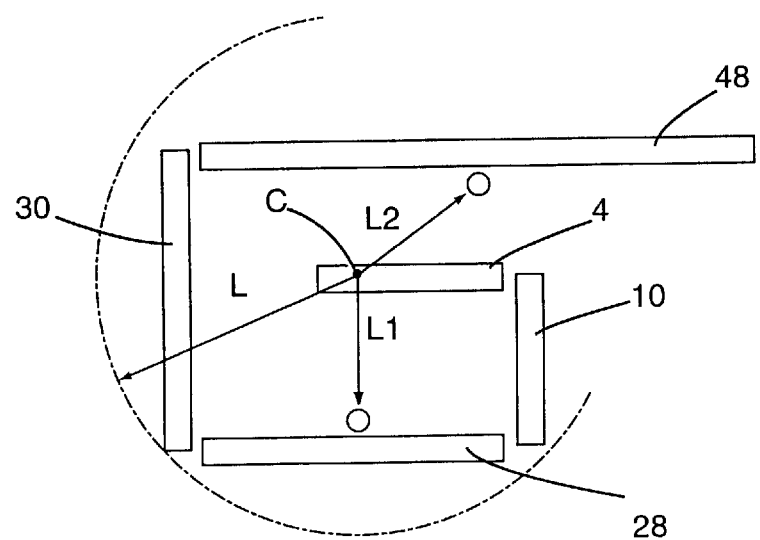
FIGS. 7(a) and 7(b) are drawings for further explaining the functions of the automobile manufacturing line of the present invention.

FIG. 7(a) shows the spiral arrangement or layout of the automobile manufacturing line 1. The spiral arrangement includes first assembly line 4, first conveyor system 10, second assembly line 28, second conveyor system 30, and third assembly line 48. The starting point C of the manufacturing is at the center of the circle with the radius L. The length of the automobile manufacturing line 1 is shortened by centralizing the layout of the automobile manufacturing line. As a result, the walking distance L1 and L2 for associates on the assembly line from the manufacturing starting point C to the desired line position is reduced.

Figure 7B:
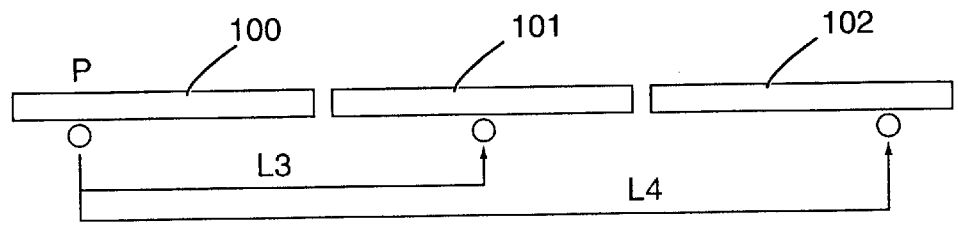

FIG. 7(b) shows the layout or arrangement of a prior art manufacturing line which includes first assembly line 100, second assembly line 101, and third assembly line 102 in a straight line. The overall manufacturing line is longer and therefore the walking distances L3 and L4 for associates from the initiation point to the desired line position is longer.

It is not essential that the first conveyor system 10 and the second conveyor system 30 be overhead conveyors, and other options are available. For example, the second conveyor system 30 can be installed on the floor and parts conveyor 53 can be an overhead conveyor that goes above the second conveyor system 30, or parts conveyor 53 can be a tunnel-type conveyor where it passes below the second conveyor system 30. Similarly, the first conveyor system can be installed on the floor like the second conveyor system discussed above, and left side panel conveyor 51*a* can be located overhead going over the first conveyor system 10, or the left side panel conveyor 51*a* can be a tunnel-type where it passes under the first conveyor system 10.

The present invention may be embodied in other specific forms without departing from the spirit or essential characteristics thereof. The presently disclosed embodiments are therefore to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. An automobile manufacturing line comprising:
    (a) a first assembly line;
    (b) a second assembly line positioned parallel to said first assembly line, on one side thereof;
    (c) a third assembly line positioned parallel to said first assembly line, on the other side thereof,
    (d) a first conveyor located between said first and second assembly lines, for carrying work pieces from the end of said first assembly line to the beginning of said second line; and
    (e) a second conveyor located between said second assembly line and said third assembly line, for carrying workpieces from the end of said second assembly line to the beginning of said third assembly line;
    wherein said first assembly line, said first conveyor, said second assembly line, said second conveyor, and said third assembly line are arranged in a substantially spiral configuration such that a workpiece moves from a beginning of said first assembly line to an end thereof, then from the end of the first assembly line to a beginning of said second assembly line on said first conveyor, then from the beginning of said second assembly line to an end thereof, then from the end of the second assembly line to a beginning of said third assembly line on said second conveyor.

2. An automobile manufacturing line as set forth in claim 1, further including a first subassembly line for providing workpieces to said second assembly line for attachment to the workpieces coming from said first conveyor to said second assembly line.

3. An automobile manufacturing line as set forth in claim 1, wherein at least one of said first and second conveyors is an overhead conveyor.

4. An automobile manufacturing line as set forth in claim 3, further including a first subassembly line for providing workpieces to said second assembly line for attachment to the workpieces coming from said first conveyor to said second assembly line, wherein said first conveyor is an overhead conveyor and at least a portion of the workpieces from said first subassembly line pass underneath said first conveyor.

5. An automobile manufacturing line as set forth in claim 1, wherein said first conveyor includes a quality inspection area.

6. An automobile manufacturing line as set forth in claim 5, wherein said first conveyor includes a stocking area for stocking a plurality of workpieces.

7. An automobile manufacturing line as set forth in claim 1, wherein said second conveyor is an overhead conveyor and includes a quality inspection area, and wherein parts delivered to the beginning of said first assembly line pass underneath said second conveyor.

8. An automobile manufacturing line as set forth in claim 7, wherein said second conveyor includes a stocking area for stocking a plurality of workpieces.

\* \* \* \* \*